L. E. RODGERS.
APPARATUS FOR DRYING PRODUCTS OF CLAY OR THE LIKE.
APPLICATION FILED NOV. 18, 1913.
1,103,435.
Patented July 14, 1914.
9 SHEETS—SHEET 1.
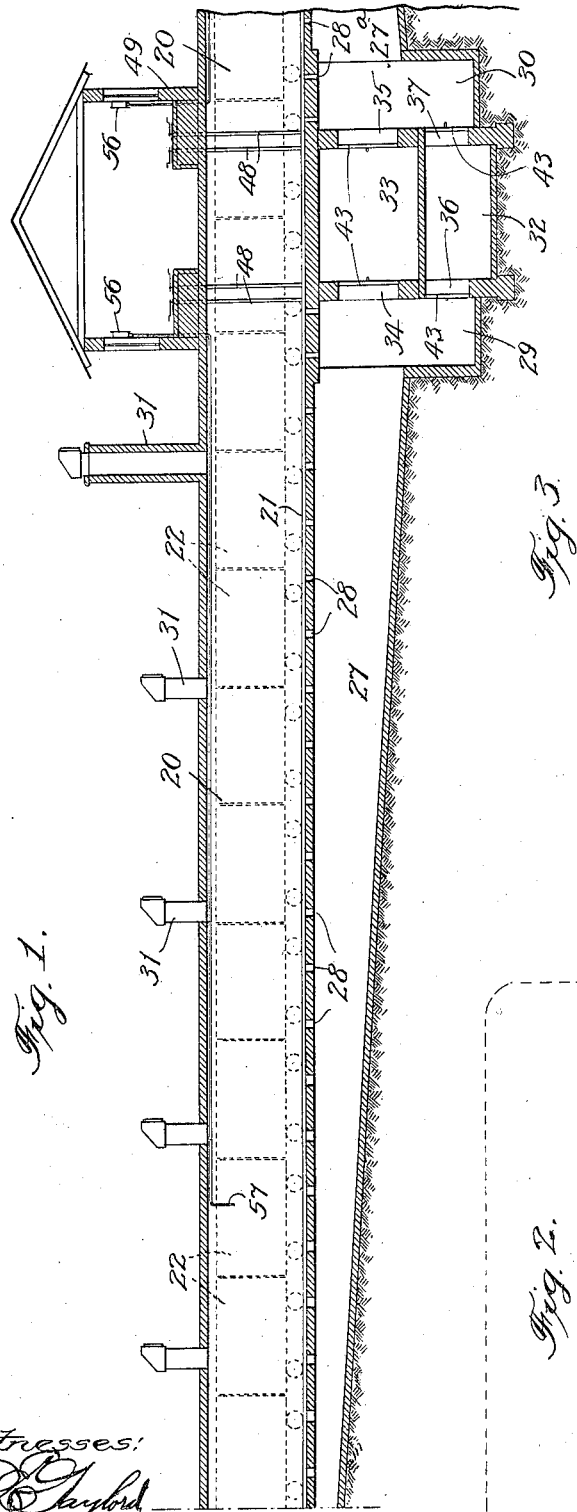
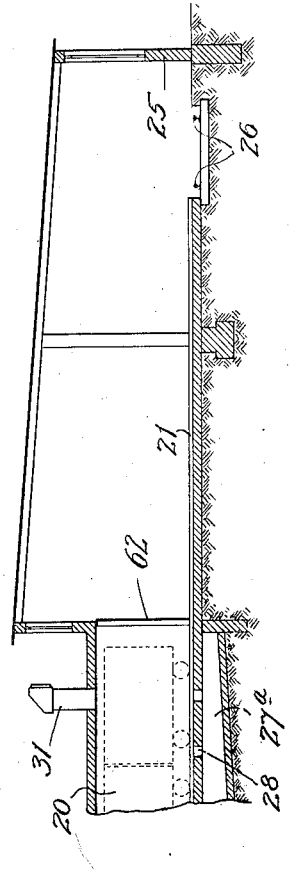
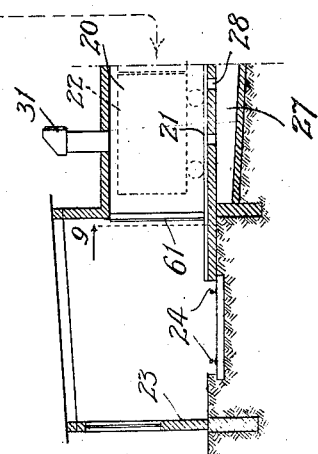
Inventor:
Louis E. Rodgers,
By Dyrenforth, Lee, Chritton and Wiles
Attys.

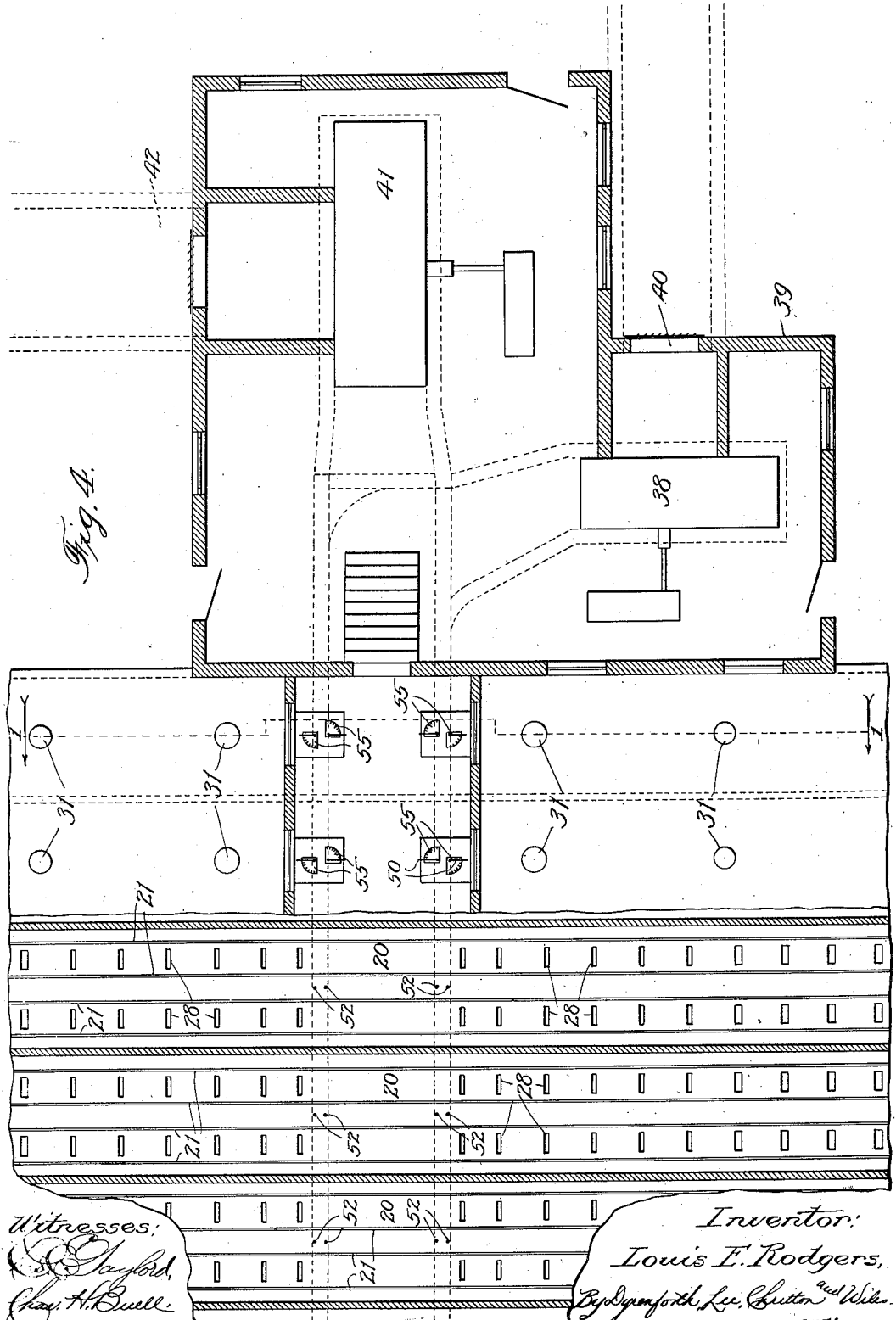

L. E. RODGERS.
APPARATUS FOR DRYING PRODUCTS OF CLAY OR THE LIKE.
APPLICATION FILED NOV. 18, 1913.
1,103,435.
Patented July 14, 1914.
9 SHEETS—SHEET 3.
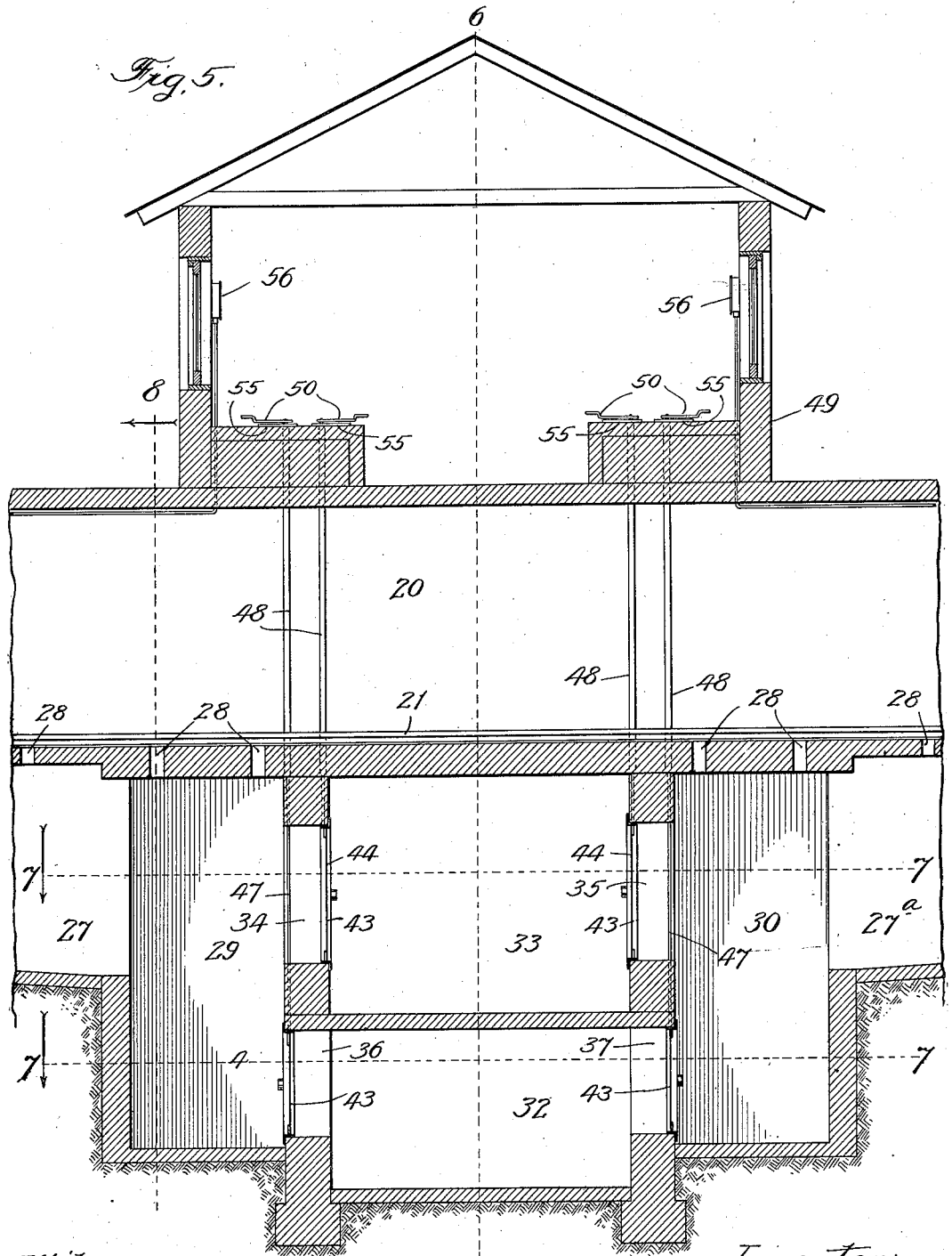

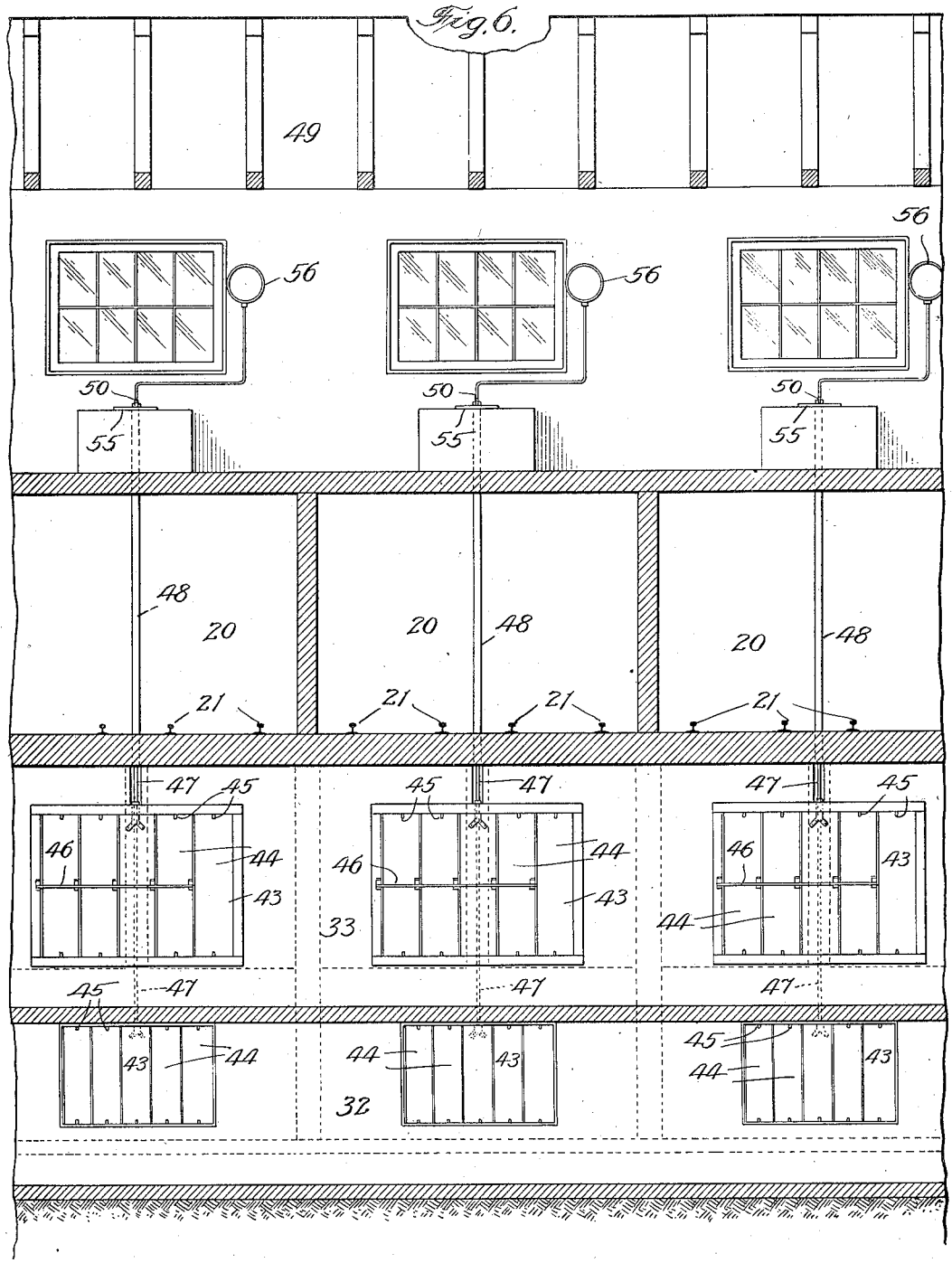

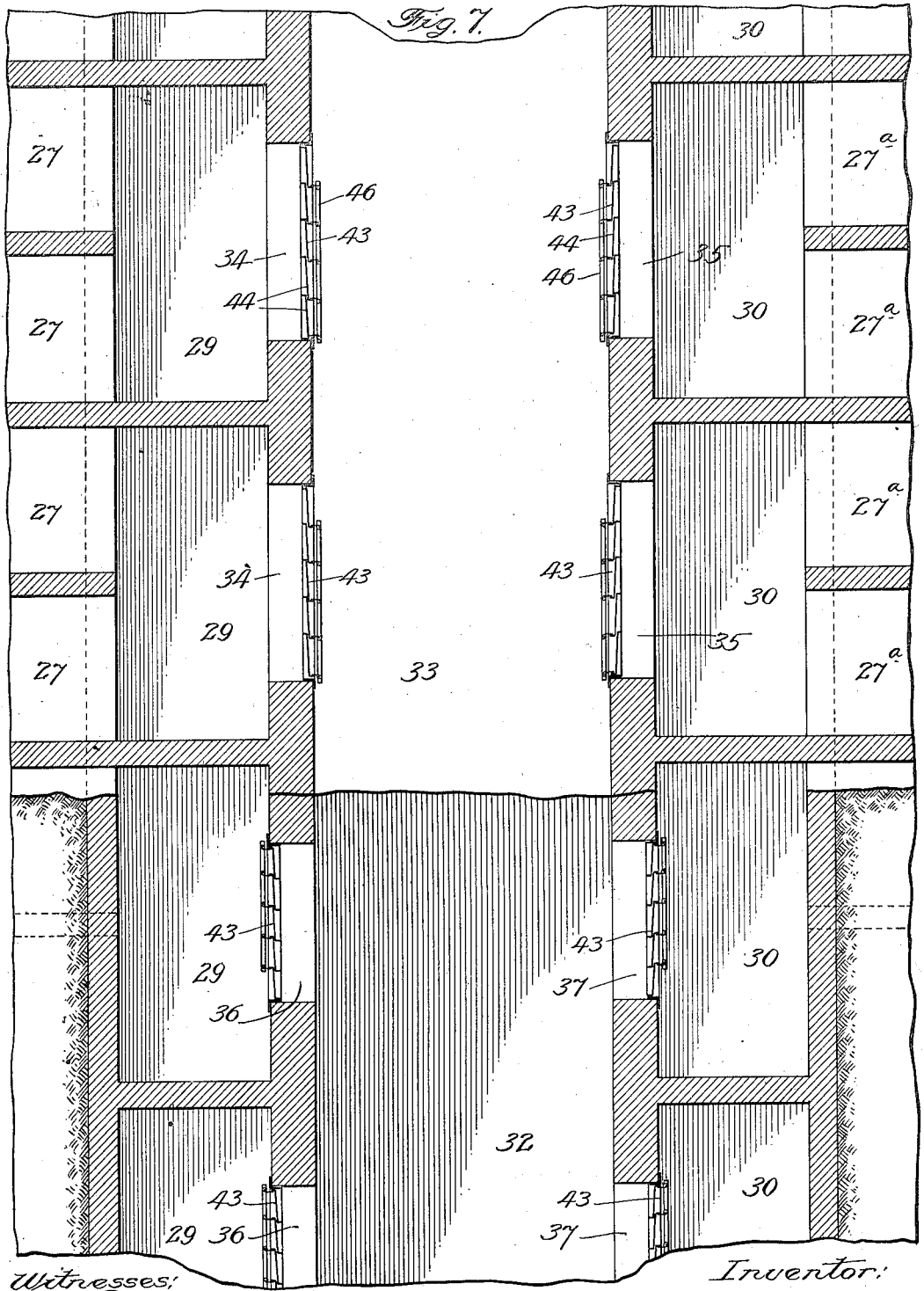

L. E. RODGERS.
APPARATUS FOR DRYING PRODUCTS OF CLAY OR THE LIKE.
APPLICATION FILED NOV. 18, 1913.

1,103,435.

Patented July 14, 1914.
9 SHEETS—SHEET 6.

Witnesses:

Inventor:
Louis E. Rodgers,
By Dyrenforth, Lee, Chritton & Wiles
Attys.

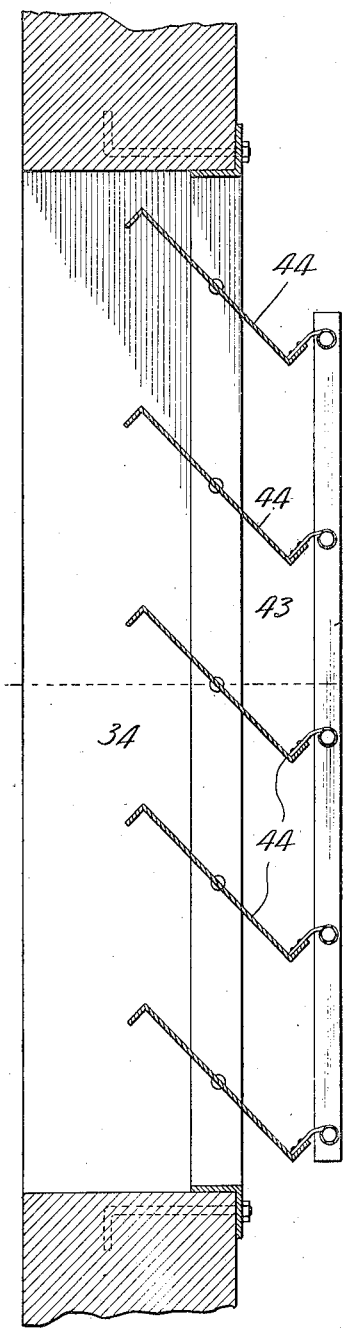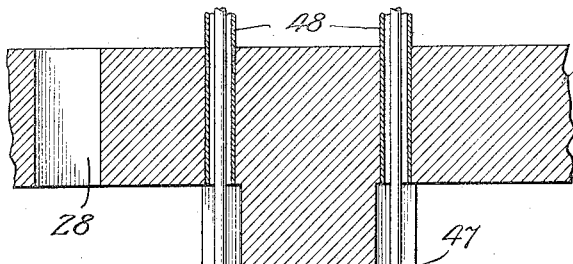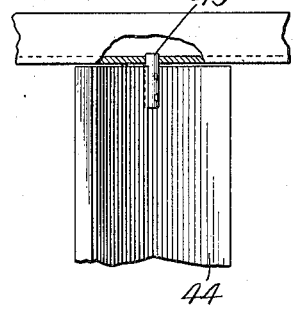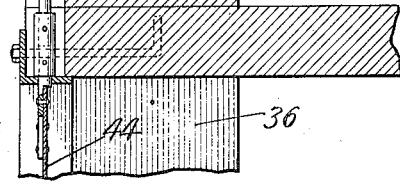

L. E. RODGERS.
APPARATUS FOR DRYING PRODUCTS OF CLAY OR THE LIKE.
APPLICATION FILED NOV. 18, 1913.
1,103,435.  Patented July 14, 1914.
9 SHEETS—SHEET 8.
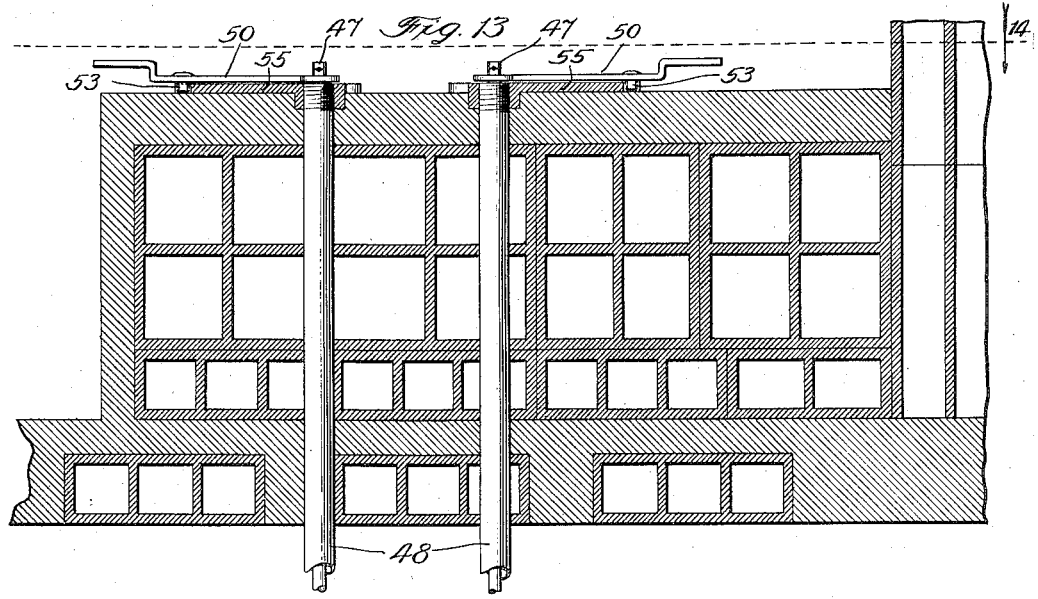
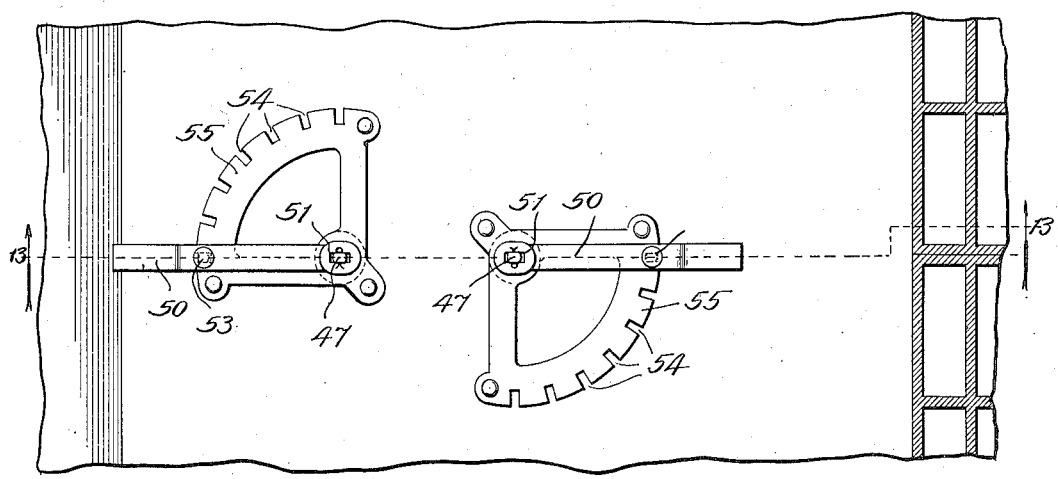
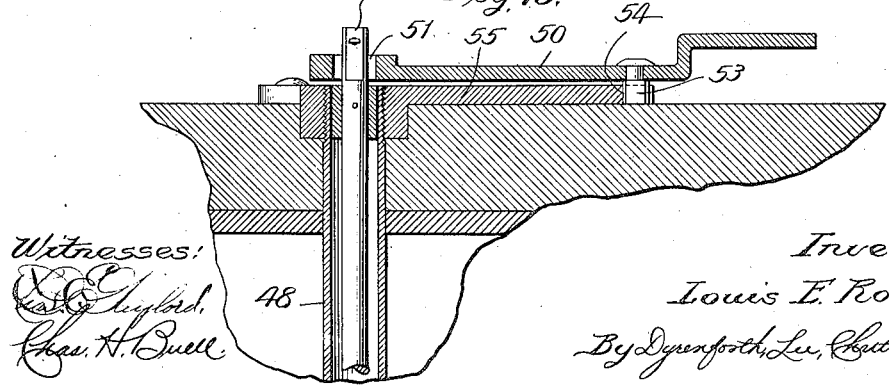

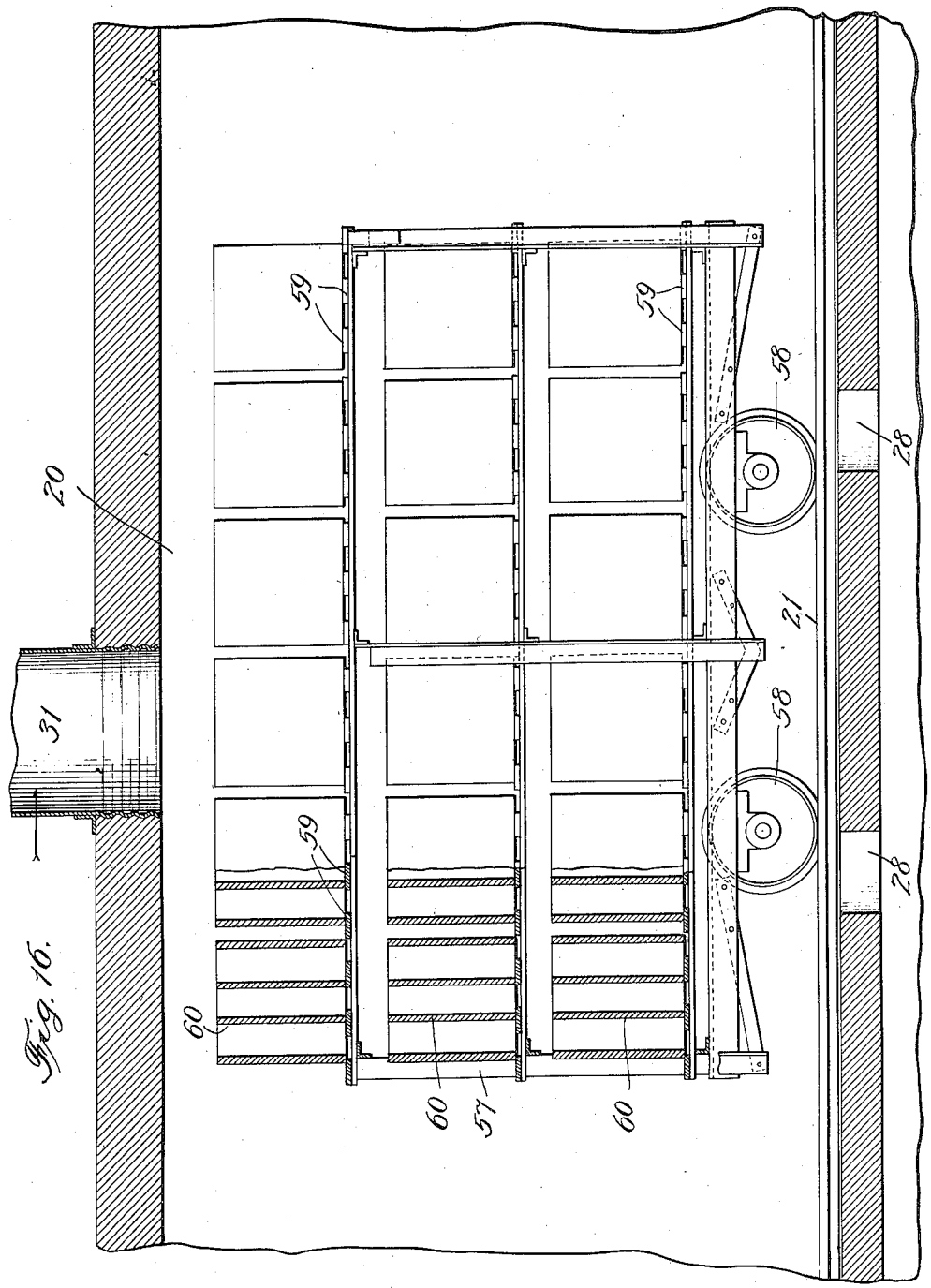

UNITED STATES PATENT OFFICE.

LOUIS E. RODGERS, OF CHICAGO, ILLINOIS.

APPARATUS FOR DRYING PRODUCTS OF CLAY OR THE LIKE.

1,103,435. Specification of Letters Patent. Patented July 14, 1914.

Application filed November 18, 1913. Serial No. 801,681.

*To all whom it may concern:*

Be it known that I, LOUIS E. RODGERS, a citizen of the United States, residing at Chicago, in the county of Cook and State of Illinois, have invented a new and useful Improvement in Apparatus for Drying Products of Clay or the like, of which the following is a specification.

My invention relates particularly to a new and useful apparatus for drying articles requiring the elimination of moisture therefrom and particularly products of clay or the like, as for example brick and tile.

In the use of apparatus as hitherto provided, great difficulty has been encountered in the drying of clay products, especially of hollow form, when made of certain varieties of clay, due to checking and warping, resulting in so impairing the articles as to render them useless. I have devised my improved apparatus especially for use with these tender varieties of clays, though it may be used to advantage in drying articles formed of other kinds of clay or other materials; my object being to provide for the economical and rapid drying of articles from which the moisture is to be eliminated, and particularly those made of the so-called tender clays, without warping or checking the articles.

Figure 8:
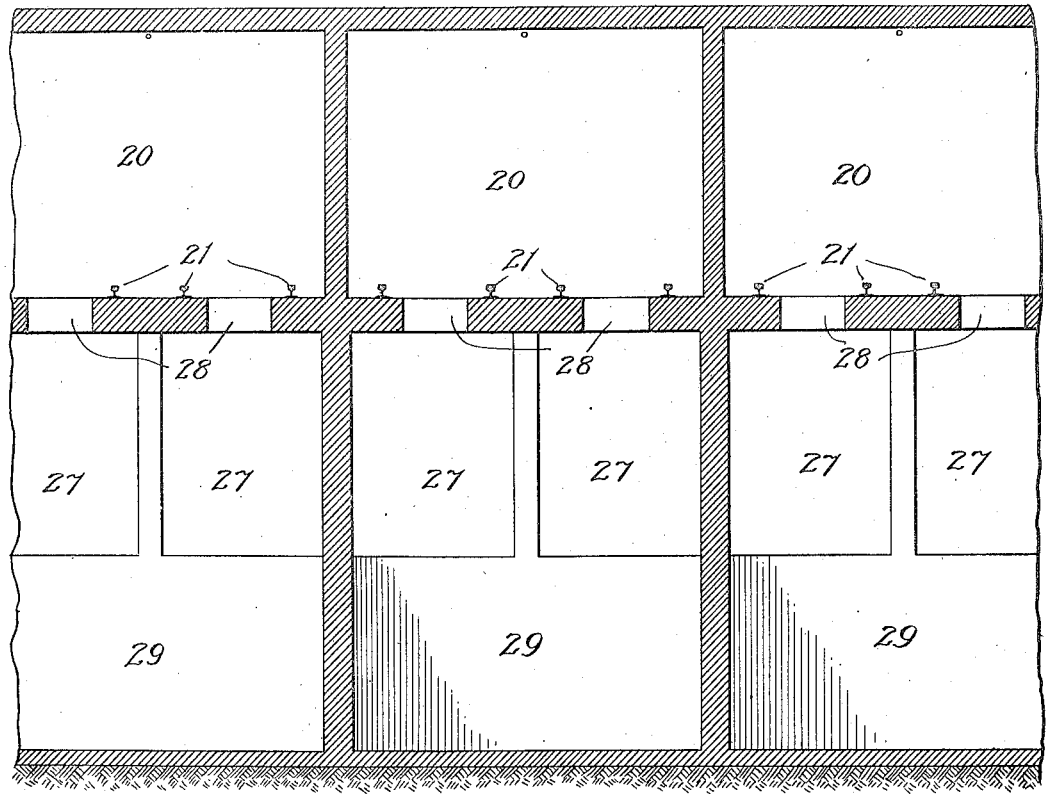
Figure 9:
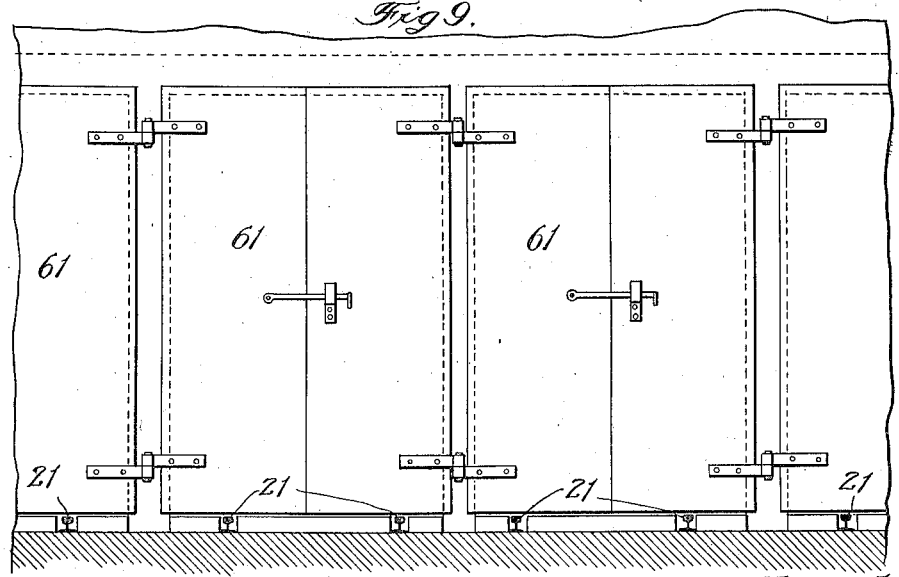

Referring to the accompanying drawings, in which I have illustrated my improved apparatus, Figure 1 is a broken view in vertical sectional elevation of my improved drying apparatus, the section being taken, through one of the drying tunnels, at the line 1 on Fig. 4 and viewed in the direction of the arrow. Fig. 2 is a similar view constituting a continuation of the left-hand end of the tunnel of Fig. 1. Fig. 3 is a similar broken view of the other end of said tunnel. Fig. 4 is a broken plan section of a portion of the apparatus of Fig. 1. Fig. 5 is an enlarged vertical sectional view of the structure shown at the right-hand end of Fig. 1, this structure, in the construction illustrated, being located midway between the ends of the tunnels. Fig. 6 is a section taken at the line 6 on Fig. 5 and viewed in the direction of the arrow. Fig. 7 is a sectional view taken in two horizontal planes on the line 7 in Fig. 5. Fig. 8 is a section taken at the line 8 on Fig. 5 and viewed in the direction of the arrow. Fig. 9 is an enlarged view in elevation of the doors controlling the loading-end of the tunnel, this view being taken at the line 9 on Fig. 2 and viewed in the direction of the arrow. Fig. 10 is a horizontal plan section taken through the wall dividing the hot-air conduit from one of the mixing chambers, showing the construction of valve employed for controlling the admission of hot air into said chambers, the section being taken at the line 10 on Fig. 11 and viewed in the direction of the arrow. Fig. 11 is a section taken at the line 11 on Fig. 10 and viewed in the direction of the arrow. Fig. 12 is a view in elevation, partly sectional, showing the manner of pivoting the members forming the valve shown in Fig. 10. Fig. 13 is a view in vertical sectional elevation of the manually-controlled mechanism for operating certain of the sets of valves, the section being taken at the line 13 on Fig. 14 and viewed in the direction of the arrow. Fig. 14 is a section taken at the line 14 on Fig. 13 and viewed in the direction of the arrow. Fig. 15 is a vertical sectional view of one of the similar valve-operating mechanisms shown in Fig. 13, this view showing further details of this mechanism; and Fig. 16 is an enlarged broken view in vertical sectional elevation taken longitudinally through one of the tunnels and showing one of the similar cars preferably employed for supporting the articles to be dried, the car being shown as loaded with hollow tile positioned thereon in the preferred manner.

In carrying out my invention I provide, preferably, a series of tunnels 20 arranged side by side and of any desired length, these tunnels being provided for the purpose of receiving the articles to be dried, and to this end the floor of each tunnel is provided with two tracks 21 extending throughout the length of the tunnels and upon which the cars 22, upon which the articles to be dried, are run.

Extending across one end of the apparatus and transversely of the tunnels 20 is a housing 23 containing a track 24 upon which runs a transfer-car, not shown, which carries the loaded cars 22 into registration with the tunnel 20 into which they are to be introduced, and from which transfer-car they are run upon the tracks 21, the opposite end of the apparatus being provided with a housing 25, similar to the housing 23, and likewise provided with a track 26 upon which runs a car, not shown, for receiving the cars 22 and conducting them out of the apparatus after the drying operation has been completed.

Located beneath each tunnel 20 and extending longitudinally thereof, are feeder-ducts 27 and 27ᵃ each of which communicates with the tunnel 20 above it through the medium of openings 28 in the floor of the tunnel. The feeder-ducts 27 and 27ᵃ serve to conduct heated air supplied to them as hereinafter described, into the tunnels 20. In the preferred construction illustrated, each of the feeder-ducts 27 opens at a point adjacent to the middle of the tunnels 20 into a mixing chamber 29, and each of the feeder-ducts 27ᵃ at the opposite end of the apparatus open, adjacent to the middle of the tunnels, into a mixing chamber 30.

In the operation of the illustrated apparatus, air in the properly heated condition is introduced into the feeder-ducts 27 and 27ᵃ and from these feeder-ducts into the tunnels 20 through the openings 28 which are preferably so graduated in size as to cause the tunnels 20 to be heated approximately to the same temperature throughout their length, the moisture-laden air passing out of the tunnels through ventilators 31 in the roofs of the tunnels.

In the particular construction illustrated, a cold-air conduit 32 with a superposed hot-air conduit 33, is located below the tunnels 20 and between the chambers 29 and 30 and extend transversely of the tunnels 20. Valved-openings 34 and 35 are provided between the hot-air conduit 33 and the mixing chambers 29 and 30, respectively, and similar valved-openings 36 and 37 are provided between the cold-air conduit and these mixing chambers, it being understood that the conduits 32 and 33 may be caused to communicate with any one or all of the chambers 29 and 30 by manipulation of the valves, as hereinafter described, controlling the openings 34, 35, 36 and 37. The conduit 32 communicates with the discharge-end of a blast-fan 38 located in a housing 39, with the suction end of the fan in communication with the atmosphere, as through a window 40, in the housing. The conduit 33 communicates with the discharge-end of a blast-fan 41 in the housing 39, and in communication at its suction end with any suitable supply of heated air, which, in practice, would preferably be the waste heat derived from the kilns in which the dried products are burned by the cooling of the kilns, and which in the construction illustrated would be conducted into the fan 41 through a conduit 42.

In the operation of the apparatus it is necessary at different stages in the drying process, that the temperature of the air introduced into the tunnels 20 be varied from time to time, and this is effected by controlling the admission of air from the conduits 32 and 33 into the mixing chambers 29 and 30, which is accomplished by manipulating the valves at the openings 34, 35, 36 and 37. The form of valves and the means for operating them may be of any suitable construction, that shown in the drawings being desirable. In this arrangement the valves represented at 43 are of the shutter type, involving a series of upright shutters 44 trunnioned, as indicated at 45, in the upper and lower sides of the openings to be controlled thereby, the shutters 44 of each series thereof being connected together, to operate in unison, by a connecting rod 46 and serving to effectually close the opening controlled thereby when swung to the position represented in Figs. 5 and 6. Each of the valve mechanisms 43 is adapted to be moved to closed or open condition and to any intermediate position, through the medium of a shaft 47 which is connected with the trunnion of one of the shutters 44, and which, when turned, will, through the medium of the bar 46, simultaneously actuate in the same direction all of the shutters with which it coöperates. In the arrangement illustrated, the operating shafts 47 pass upwardly through tubes 48 opening through the floors and roofs of the tunnels 20 and into a housing 49 extending directly above the conduits 32 and 33 and in parallel relation thereto. The upper ends of the shafts 47 are equipped with operating handles 50, through the medium of which the shafts 47 may be rotated, for a purpose hereinbefore explained. The handles 50 are shown as provided with slots 51 at which they fit over the upper flattened ends of the shafts 47, the outer ends of the handles being equipped with depending lugs 53 adapted to be moved into any one of the notches 54 of coöperating stationary segments 55, the handles, in the operation of the apparatus, to manipulate the valves, being first bodily raised to disengage the lugs 53 from the notches 54 and then turned to the position desired, and again lowered to engage the lugs 53 with the corresponding notches 54. It will thus be understood that all of the operating handles 50, each adapted to control one of the valve mechanisms 43, are located conveniently to the operator who would be stationed in the housing 49, which latter, in addition to containing the valve-controlling means, as stated, is equipped with recording thermometers 56 of a well-known construction, one of each of said thermometers being provided for each of the two sections of each tunnel 20, with the bulbs 57 thereof located preferably midway between the middle and ends of the tunnels 20, thus indicating to the operator the amount of heat in any one of the tunnels at any time during the drying operation, and enabling him, by operating the valves 43, to establish in each of the tunnels 20, independently of the other, the desired heat condition.

While any suitable form of support for the articles while in the tunnels 20 may be used, it is preferred that cars of the general form illustrated in Fig. 16 be employed, each of which involves a framework 57 mounted on wheels 58 which travel on the tracks 21, and decks each formed of slats 59 spaced apart and upon which the articles to be dried are placed, the articles when of hollow form being preferably placed upon the open-work decks 59 at their open ends, as represented of the tile 60, in Fig. 16.

The operation of the apparatus is as follows: The cars 22 loaded with the articles to be dried, are introduced into the tunnels 20 through the housing 23 and through doors 61, to preferably fill the tunnels 20 with loaded cars. After charging the tunnels as stated, the doors 61 and similar doors 62 at the unloading ends of the tunnels 20, are closed to render the tunnels substantially air-tight at their ends. The operator stationed in the housing 49 thereupon manipulates the valves 43 controlling the openings 34, 35, 36 and 37 to permit hot and cold air to pass from the conduits 33 and 32, respectively, in the desired proportions and at the desired velocity, to cause air at the desired temperature and moving at the desired velocity to pass into the tunnels 20 from the ducts 27 and 27$^a$, the air discharged from the conduits 32 and 33 becoming mixed in the chambers 29 and 30 preliminary to their passage into the feeder-ducts 27 and 27$^a$. The temperature and velocity of the air introduced into the tunnels 20 will depend upon the character of the articles to be dried and the kind of material from which they are formed. Thus, where the articles are constructed of very tender clay, it is desirable that they be first treated, for a length of time depending on the particular kind of clay of which they are constructed, to a relatively light current of air slightly warmed for tempering them, and after becoming tempered, then subjected to air of increasing velocity and increasing temperature up to a certain point, depending upon the character of the articles and the kind of clay from which they are constructed.

As an example of the manner of utilizing my improved apparatus for tender clays, the drying of articles made from clay found in and about St. Marys, Pennsylvania, may be cited. In drying fire-proofing formed of this clay, the articles after being placed in the tunnels 20 are subjected, for about three hours, to heated air at about 70° to 80° F., the valves 43 being so set that the air at this temperature will flow into the tunnels 20 sufficiently fast merely to maintain the articles at this temperature. Air at about 130° F. is then introduced into the tunnels 20 for about four hours. The articles by this time will be so thoroughly seasoned that they may then be subjected to the final drying temperature anywhere from 200° to 250° F., or even higher, if desired, which is maintained until the articles are finally dried. The operator, however, is able by the apparatus disclosed not only to determine the actual heat condition of the tunnels 20, but to vary such conditions as conditions require. After the drying operation has been completed the cars are removed from the tunnels 20 at the unloading end of the apparatus, and the previously described operations are repeated for each new charge of articles to be dried.

If desired, the articles may be cooled in the tunnels by introducing therein cold air, or cooled in the housing at the unloading ends of the tunnels.

The provision of the ventilators 31, especially in connection with the openings 28 in the floors of the tunnels is of great advantage, as the moisture taken up by the heated air from the articles, instead of being drawn along the length of the tunnels and in contact with a large portion of the articles being dried which affords disadvantages, moves substantially upwardly, taking up the moisture in the articles and discharging from the tunnels through the ventilators 31; this feature of the apparatus being of especial importance where the articles to be dried are hollow tile, or the like, and are supported upon cars, as explained of the construction shown in Fig. 16, as thereby the articles are subjected in a substantially uniform manner to the heated air, which greatly reduces danger of warping.

It will be understood from the foregoing that according to the preferred described operation of the apparatus the articles to be dried are first tempered, and thereafter the drying operation completed in the same compartment, as distinguished from tempering the articles in one compartment and then transferring them to another, wherein they are subjected to greater heat. This feature especially in connection with the positive and accurate control of the heat in the drying compartment is of great advantage, particularly in drying tender clays, which are very susceptible to marked changes in temperature and to currents of air, especially when in "green" condition.

Another advantage of the apparatus illustrated is that of providing for the isolation of each tunnel from the others and the controlling of the introduction of the heat into each tunnel independently of the others. This feature is of great advantage to a manufacturer, as articles of different form and of different materials requiring different degrees of heat treatment and for different lengths of time may be properly treated in the respective compartments. Furthermore, the arrangement illustrated might well be termed a "unit system" as each of the tunnels is independent of the others, thus permitting other tunnels to be added, as desired, to those originally constructed. Where the tunnels 20 are of relatively great length, as for example two hundred feet long, it is found desirable that they be fed with the drying air intermediate their ends, as shown in the drawings and hereinbefore explained, but it will be readily understood that the location and arrangement of the hot and cold air conduits may be varied, as desired, to suit the particular conditions presented in each case. Furthermore, while I have shown the valves 43 as manually operated, it will be understood that, if desired, they may be operated in any other suitable way, and in fact the apparatus illustrated may be modified and altered in many particulars in addition to those above pointed out without departing from the spirit of my invention, it being my intention and desire to claim the invention as fully and completely as the prior state of the art will permit.

What I claim as new and desire to secure by Letters Patent is—

1. A drier-apparatus comprising a chamber for receiving the articles to be dried, hot and cold air conduits, means for forcing hot and cold air through said conduits, respectively, a feeder-duct communicating with said chamber and with said conduits and extending lengthwise of said chamber, and valves controlling communication between said conduits and said feeder-duct.

2. A drier-apparatus comprising a chamber for receiving articles to be dried, hot and cold air conduits, means for forcing hot and cold air through said conduits, respectively, a feeder-duct below said chamber and extending lengthwise thereof and containing openings at intervals in its top and communicating with said feeder-duct and chamber, and valves for controlling communication between said conduits and said feeder-duct.

3. A drier-apparatus comprising a chamber for receiving the articles to be dried, hot and cold air conduits, means for forcing hot and cold air through said conduits, respectively, a feeder-duct extending lengthwise of said chamber and communicating with the latter, a mixing chamber interposed between, and in communication with, said feeder-duct and conduits, and valves controlling the introduction of air from said conduits into said mixing chamber.

4. A drier-apparatus comprising a plurality of non-communicating chambers arranged side-by-side for receiving the articles to be dried, feeder-ducts extending lengthwise of said chambers and communicating therewith, conduits for hot and cold air, respectively, extending transversely of said chambers and in communication with said feeder-ducts, and valves separately controlling the admission of air from said conduits into said chambers.

5. A drier-apparatus comprising a plurality of non-communicating chambers arranged side-by-side for receiving the articles to be dried, feeder-ducts extending longitudinally of said chambers and beneath them with openings at intervals in their top-walls affording connection between each chamber and the feeder-duct below it, a mixing chamber for each feeder-duct at one end of the latter, hot and cold-air conduits extending transversely of said chambers and having openings at which they communicate with said mixing-chambers, and valves for said last-referred to openings, whereby the introduction of hot and cold air into said mixing-chambers may be controlled.

6. A drier-apparatus comprising a series of chambers arranged side by side for receiving the articles to be dried, hot and cold air conduits communicating with said chambers, means for forcing hot and cold air through said conduits, respectively, valves separately controlling the passage of air from said conduits into said chambers, and valve-operating means arranged in a series extending transversely of said chambers.

7. A drier-apparatus comprising a series of chambers arranged side by side for receiving the articles to be dried, hot and cold air conduits communicating with said chambers, means for forcing hot and cold air through said conduits, respectively, valves separately controlling the passage of air from said conduits into said chambers, and valve-operating means arranged in a series and extending upwardly and transversely of said chambers.

8. A drier-apparatus comprising a series of chambers arranged side by side for receiving the articles to be dried, hot and cold air conduits extending transversely of said chambers intermediate the ends of the latter and communicating with said chambers intermediate the ends of the latter for supplying air to the opposite ends of said chambers, and means for controlling the introduction of the air from said conduits into said chambers.

9. A drier-apparatus comprising a series of chambers arranged side by side for receiving the articles to be dried, hot and cold air conduits extending transversely of said chambers intermediate the ends of the latter and communicating with said chambers intermediate the ends of the latter for supplying air to the opposite ends of said chambers, valves for controlling the introduction of the air from said conduits into said chambers, and valve-operating means for each valve extending upwardly and arranged in a series exterior of said chambers and extending transversely of the latter.

LOUIS E. RODGERS.

In presence of—
A. C. FISCHER,
D. C. THORSEN.